United States Patent

Harmon et al.

[11] Patent Number: 5,748,691
[45] Date of Patent: May 5, 1998

[54] APPARATUS AND METHODS FOR SEALING END PLUGS FOR NUCLEAR FUEL RODS

[75] Inventors: John L. Harmon; William C. Peters; Robert A. Haughton; Andrew A. Lingenfelter, all of Wilmington, N.C.

[73] Assignee: General Electric Company, Schenectady, N.Y.

[21] Appl. No.: 613,488

[22] Filed: Mar. 11, 1996

[51] Int. Cl.$^6$ .................................................. G21C 3/10
[52] U.S. Cl. .................. 376/261; 376/451; 219/121.64; 219/121.82
[58] Field of Search .................. 219/121.82, 121.63, 219/121.64; 376/261, 450, 451

[56] References Cited

U.S. PATENT DOCUMENTS

| | | | |
|---|---|---|---|
| 3,212,988 | 10/1965 | Ringot | 176/67 |
| 3,327,892 | 6/1967 | Lloyd et al. | 220/67 |
| 3,367,021 | 2/1968 | Beghi et al. | 29/472.9 |
| 3,378,458 | 4/1968 | Ross et al. | 176/79 |
| 3,392,438 | 7/1968 | Coulter et al. | 29/477 |
| 3,528,166 | 9/1970 | Portal et al. | 29/493 |
| 3,836,431 | 9/1974 | Flipot et al. | 176/79 |
| 4,230,930 | 10/1980 | Chang et al. | 219/121 LD |
| 4,541,055 | 9/1985 | Wolfe et al. | 364/474 |
| 4,865,804 | 9/1989 | McGeary et al. | 376/451 |
| 4,921,663 | 5/1990 | Boatwright | 376/451 |
| 5,140,128 | 8/1992 | Jones et al. | 219/121.72 |
| 5,147,999 | 9/1992 | Dekumbis et al. | 219/121.63 |
| 5,158,740 | 10/1992 | Boatwright | 376/261 |
| 5,171,963 | 12/1992 | Saruta et al. | 219/121.69 |
| 5,500,507 | 3/1996 | Yoshiaki | 219/121.82 |

FOREIGN PATENT DOCUMENTS

| | | | |
|---|---|---|---|
| 1385866 | 12/1964 | France | 376/450 |
| 0124186 | 9/1979 | Japan | 376/451 |
| 0201283 | 10/1985 | Japan | 326/451 |

Primary Examiner—Harvey E. Behrend
Attorney, Agent, or Firm—Nixon & Vanderhye

[57] ABSTRACT

End plugs for nuclear fuel rods are provided with a spot weld along the interior end face of the end plugs to seal any streamer openings or passages along the axis of the end plugs, thereby maintaining the fuel rods sealed at its opposite ends. The spot welds are applied by an automated laser welding system in which pallets of end plugs are supported on X-Y positioning tables below a laser movable in a vertical direction. By successively locating the end plugs in the pallet below the laser, the spot welds are formed along the axis of the end plugs and along the interior faces thereof sealing the end plugs.

17 Claims, 4 Drawing Sheets

APPARATUS AND METHODS FOR SEALING END PLUGS FOR NUCLEAR FUEL RODS

TECHNICAL FIELD

The present invention relates generally to apparatus and methods for fabricating end plugs for nuclear fuel rods and particularly to end plugs and methods of fabrication wherein axial or streamer leakage paths through the end plugs resultant from internal material defects are sealed along the interior end faces of the end plugs.

BACKGROUND

Nuclear fuel rods for nuclear reactors typically comprise a plurality of discrete nuclear fuel pellets disposed within a tube. The pellets are stacked within the tube, which is then evacuated, backfilled with helium and sealed by welding end plugs at each of the opposite ends of the tube. Typical nuclear fuel material-containing tubes may have outside diameters, for example, on the order of 0.4–0.5 inches, and lengths on the order of 150–160 inches. The end plugs per se are disposed at the opposite ends, i.e., upper and lower ends, and may have a length of approximately 3.5 inches or smaller and a diameter substantially approximating the diameter of the tubes. The tubes typically have a Zircaloy cladding and the end plugs are typically formed of Zircaloy, although it will be appreciated that the end plugs may be formed of other materials, such as pure zirconium or stainless steel.

In the manufacture of end plugs, the end plug material, for example, Zircaloy, is provided initially as bar stock which is then cut into blanks of appropriate length for manufacture into the end plug. A hot heading process using a special die and a heating system is used to partially shape and form the plug. Subsequently, the partially formed plug is machined to the appropriate size and configuration. In the fabrication of Zircaloy bar stock used as the raw material for the end plugs, however, it is possible for the extruding process to create tiny centerline streamer holes or passages which can escape detection by ultrasonic or other non-destructive scanning systems. These tiny holes or passages can be the source of fuel rod failure, e.g., fission gas release, during in-reactor operation. For example, water from the reactor core may migrate through the streamers or passages into the tube and decompose into hydrogen and oxygen. This would tend to corrode the inside of the tube. Additionally, streamers may permit the gas within the fuel rod to migrate out of the rod into the coolant/moderator flowing through the core. While the possibility of a fuel rod failure due to a streamer passage is very small, it is desirable to further minimize or eliminate even that possibility.

DISCLOSURE OF THE INVENTION

In accordance with the present invention, a weld is formed along the interior end face of the end plug along or coincident with the axis of the end plug after the plug has been fabricated. The applied spot weld seals the potential streamer passage(s) by melting and solidifying the material on the inner surface of the end plug. Preferably, the weld is a spot weld formed by application of a laser, as described below. Providing weld material on end plugs has been accomplished in the past in connection with sealing the centerline holes sometimes drilled through the end plugs for purposes of pressurizing the fuel rods with helium gas. That is, in some fabrication techniques, an axial hole is formed entirely through the end plug, deployed, for example, at the upper end of the fuel rod. With the lower end of the fuel rod completely sealed by the lower end plug, the upper end plug is first welded to the upper end of the fuel rod. Helium gas under pressure is supplied through the axial hole and subsequently, the end plug is sealed by applying weld material to the outer face of the end plugs. This type of welding, however, is for purpose of pressure-sealing the fuel rod rather than affording sealing integrity of the end plugs themselves against streamer passages.

To apply the spot welds on the interior end faces of the end plugs, an automated laser welding system, preferably employing a pulsed YAG laser is provided to apply centerline welds to the interior faces of the fuel rod end plugs. Particularly, the end plugs are arranged on a pallet in generally complementary-shaped openings to form an array of end plugs to be welded. The pallet and end plugs are inserted into a welding box onto an X-Y positioning table. Above the table is the laser mounted for movement in a Z direction. With locator pins accurately locating the pallet on the X-Y positioning table, the pallet may be located relative to the laser such that the spot weld can be applied to each of the faces of the end plugs upon relative displacement of the X-Y positioning table and the laser. Preferably, each pallet will be uniquely bar coded such that the various types of end plugs can be identified. The system preferably applies welds to the end plugs of like type on a single pallet such that, upon initialization of the laser and end plugs in the Z direction, only relative displacement of the positioning table and laser in the X-Y direction is necessary to spot weld each end face. The weld box prior to welding is flooded with an inert gas, preferably, argon, and welding is commenced by locating the initial end plug below the laser by movement of the X-Y positioning table. The laser is actuated to apply a spot weld in succession to each of the end plugs.

The laser system has sufficient power to provide a weld of an adequate depth on the order of the thickness of the fuel cladding. Advantageously, the welds do not deform the end plugs or contaminate the end plugs with foreign substances such as oil or grease.

In a preferred embodiment according to the present invention, there is provided a method of sealing an end plug for a nuclear fuel rod wherein the end plug has an interior end face for registration with nuclear fuel within the fuel rod, comprising the step of forming a weld on the interior end face of the end plug to seal the end face.

In a further preferred embodiment according to the present invention, there is provided, in a nuclear fuel rod containing nuclear fuel, an end plug having an interior end face for registering with the nuclear fuel within the nuclear fuel rod and a weld on the interior end face of the end plug to seal the end face.

Accordingly, it is a primary object of the present invention to provide novel and improved apparatus and methods for sealing the end plugs for nuclear fuel rods against the potential of streamer passages.

BEST MODE FOR CARRYING OUT THE INVENTION

Figure 1:
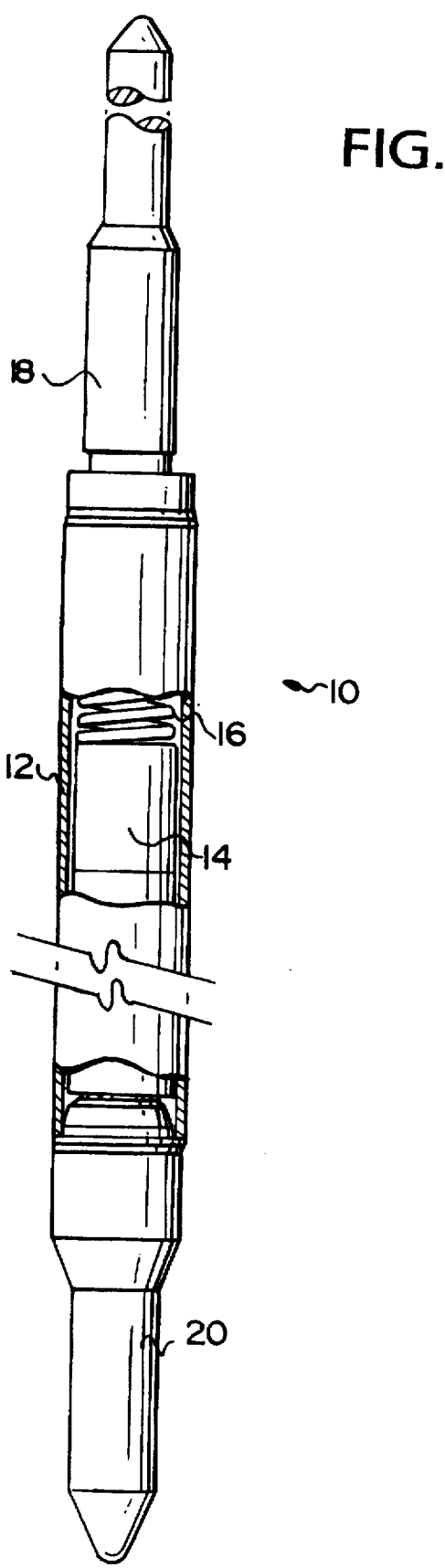
FIG. 1 is a fragmentary side elevational view with parts broken out and in cross-section of a nuclear fuel rod constructed in accordance with the present invention.

Referring now to FIG. 1, there is illustrated a fuel rod for a nuclear fuel assembly and generally designated 10. The fuel rod comprises an elongated tube 12 containing a plurality of nuclear fuel pellets 14 stacked one on top of the other. Adjacent the upper end of the rod 10 is a plenum containing a spring 16 bearing against the pellets 14 and also defining a plenum for gas expansion within the fuel rod. The opposite ends of the fuel rod are closed by upper and lower end plugs 18 and 20, respectively. The end plugs are welded to the opposite ends of the tube 12 and seal the tubes. As indicated previously, there is the possibility that very minute passages or streamer holes may be provided, generally along the central axis of the end plugs as a result of certain end plug fabricating techniques. While the possibility that such streamer openings or passages may exist is quite remote, it is desirable to eliminate even that possibility.

Figure 2:
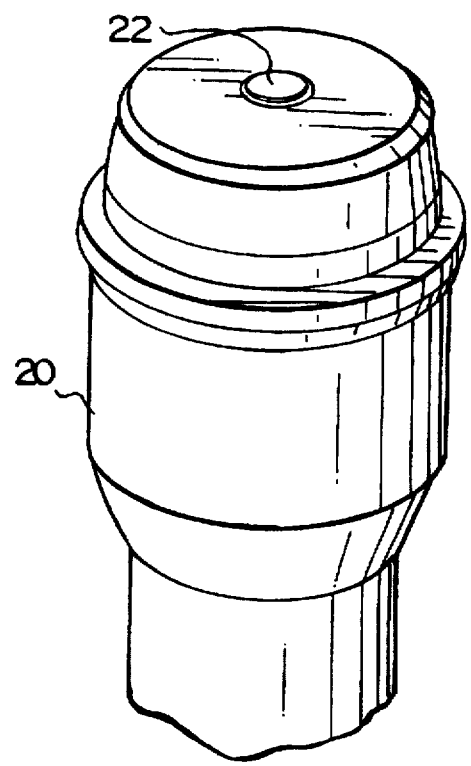
FIG. 2 is a fragmentary perspective view of an end plug for the nuclear fuel rod of FIG. 1.

In accordance with the present invention, a small spot weld is formed coincident with the axial center line of the inside end face of the end plugs to seal any potential streamer opening by melting and solidifying the material, i.e., Zircaloy, of the end plug along its inner surface. A spot weld is indicated at 22 in FIG. 2. Accordingly, should a streamer opening be extant through the end plug 18 or 20, the spot weld 22 seals the end of the opening, thus ensuring that the end plug forms an end seal for the fuel rod 10.

Figure 3:
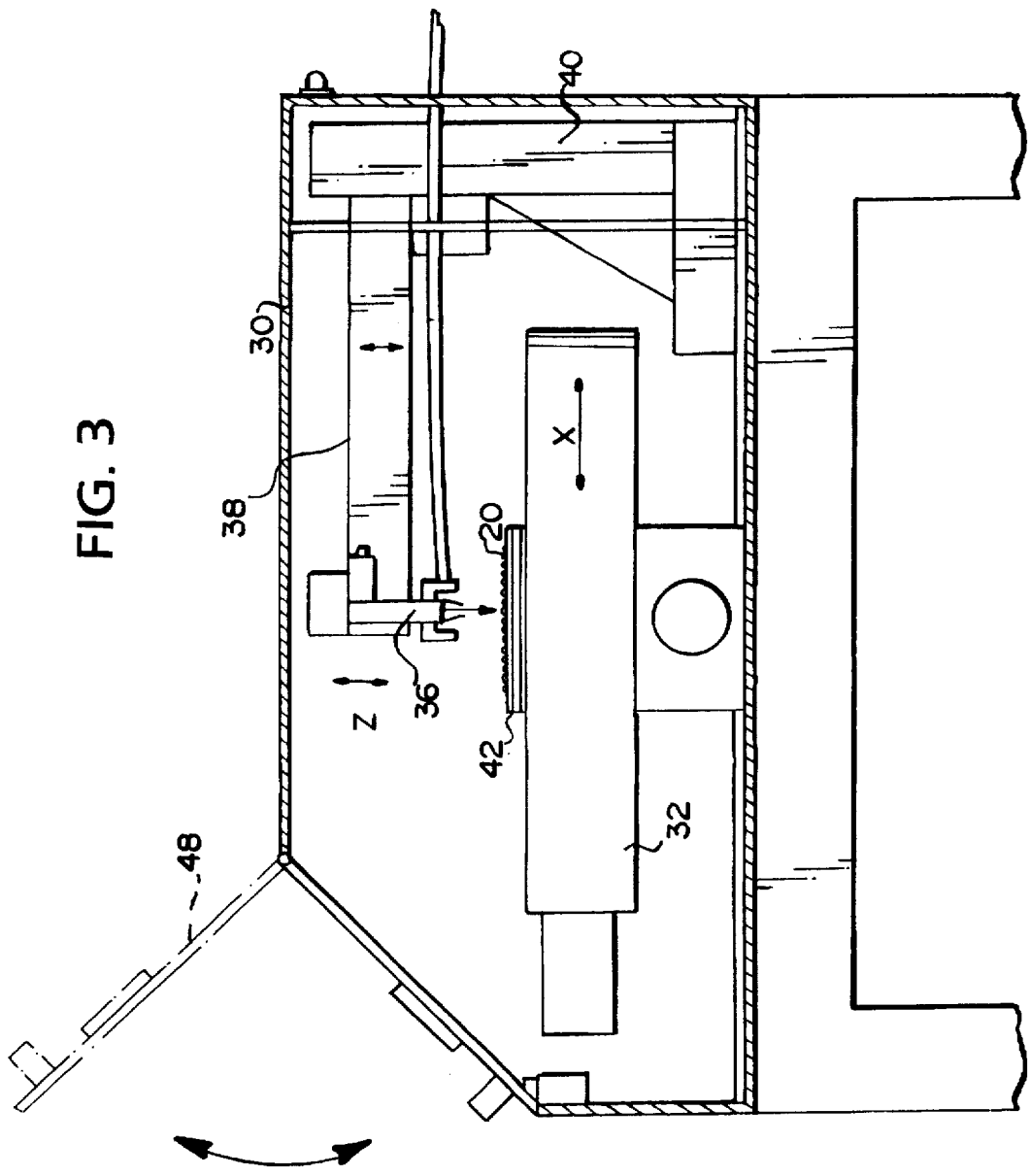
FIG. 3 is a cross-sectional view of apparatus for providing seals on the end plugs.
Figure 4:
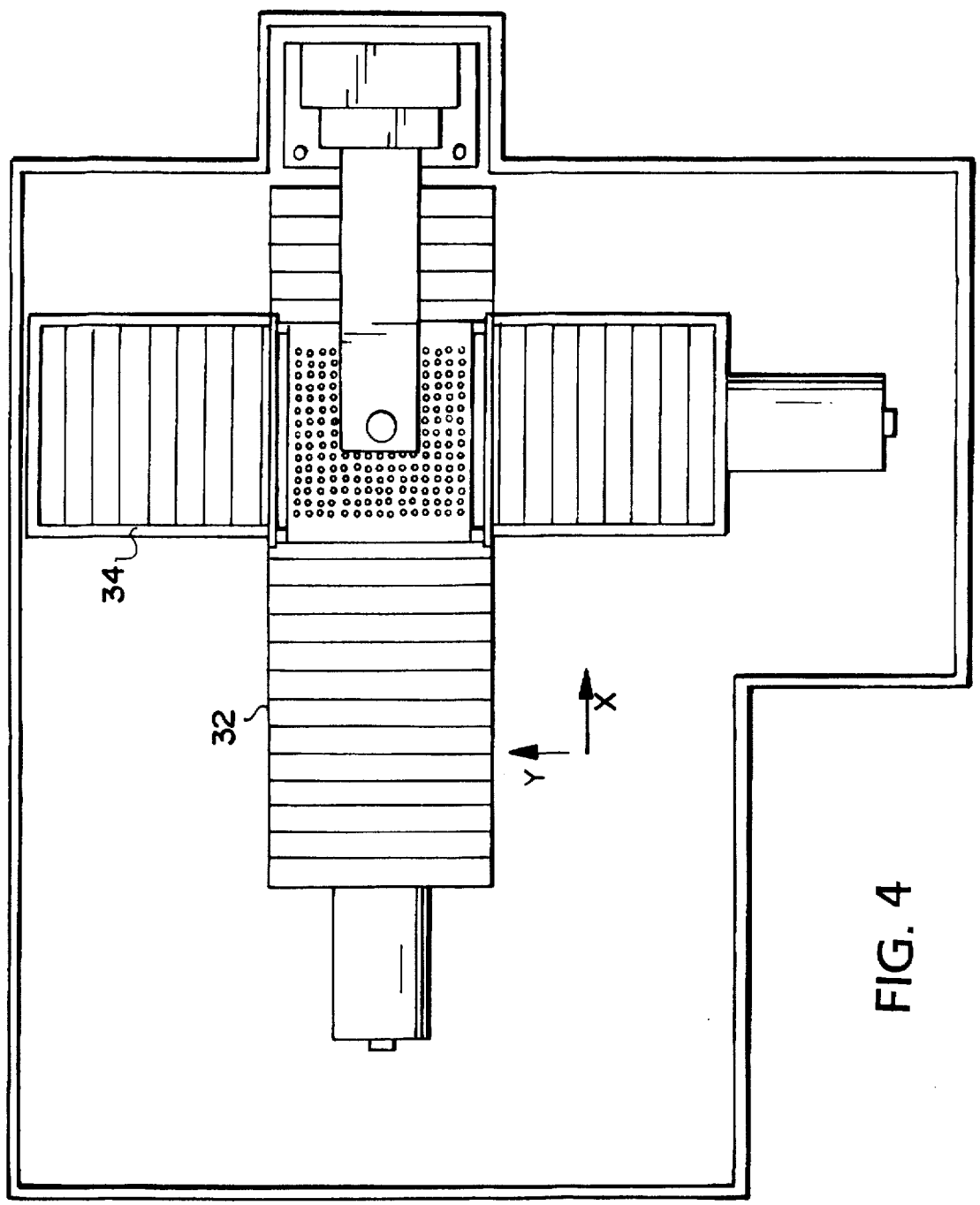
FIG. 4 is a top plan view thereof.
Figure 5:
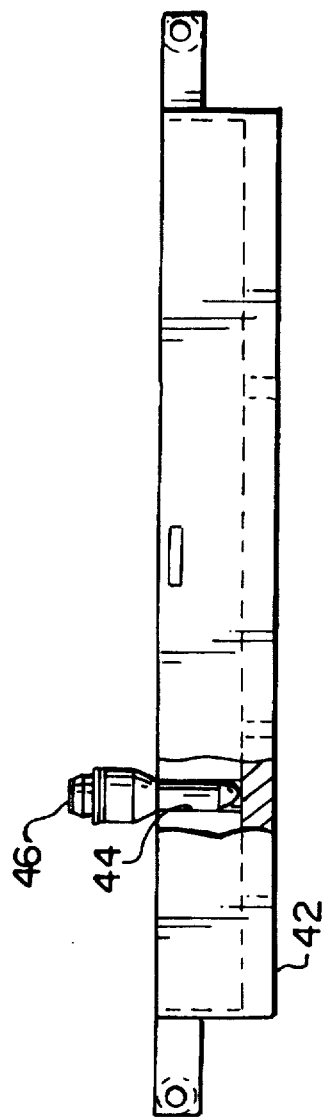
FIG. 5 is an enlarged side elevational view with portions broken out illustrating an end plug situate in a platen.
Figure 6:
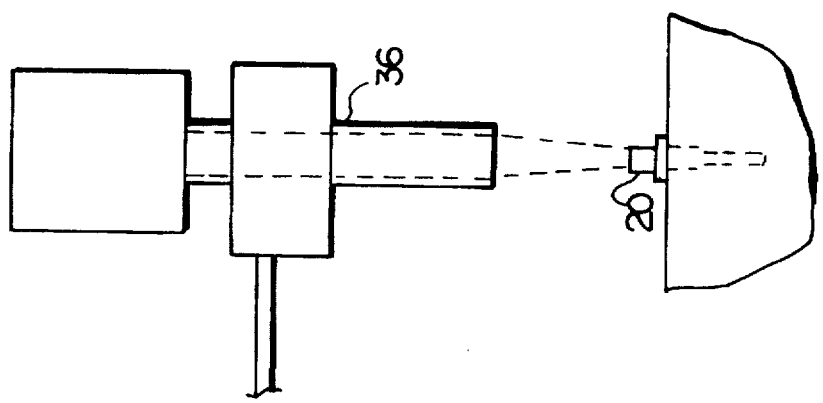
FIG. 6 is a fragmentary schematic view illustrating the laser application of a spot weld to the end face of the end plug.

Referring now to FIGS. 3 and 4, there is illustrated an automated laser welding system for applying center line welds to the interior ends of the fuel rod end plugs. Particularly, within a weld box 30, there is provided X-Y positioning tables 32 and 34, respectively, below a laser 36 mounted for vertical movement in the Z direction. The laser 36 is cantilevered over the X-Y positioning tables 32 and 34, respectively, by a support arm 38 movable vertically along a support column 40. X-Y positioning tables are well known in the art and, accordingly, the drives and control systems for the drives are not specifically disclosed.

The end plugs are presented to the laser 36 in pallets, preferably formed of stainless steel. The pallets are manually installed in the weld box 30 and pinned to one of the X-Y positioning tables. Each pallet 42 has a plurality of upwardly opening apertures 44 for receiving an end plug. The openings 44 are complementary in shape to the end plugs and thus accurately position the end plugs along the pallet and relative to the laser head 36 by pinning the pallet to one of the X-Y positioning tables. As illustrated in FIGS. 3 and 4, a plurality of end plugs, typically of a specified type, are arranged in an array, for example, a 12×12 array thereof, on the pallet 42. Under computer control, the pallet is displaced by movement of the X-Y positioning tables to locate the interior end face 46 of each end plug in succession below the laser such that the laser can form a spot weld on the end face 46. The locating pins for the pallets may comprise two or more through openings in the pallets which can then be pinned to an underlying support of one of the X-Y positioning tables. Each pallet will have a unique bar code to facilitate identification by the system control of the pallet and type of end plug being welded. When the pallet is installed and seated properly on one of the X-Y positioning tables, the operator closes the inlet door 48 of the weld box 30 and keys in a start command to the control system. The weld box 30 is initially flooded with an inert gas, preferably argon, and an oxygen monitor system, not shown, is used to assure that the oxygen content in the weld box is below a specific welding limit. During start-up, the control system also reads the bar code on the pallet and communicates with an appropriate database to determine the type of plugs loaded onto the pallet. Once the type of plug is known, the laser welder focus head 50 is positioned over a first end plug in the pallet. When the plug has been identified as being in the correct location, the laser welder will apply a spot weld along the center line of the interior end face of the end plug. Upon completing that spot weld, the control system indexes the X-Y positioning slides or tables so that the next plug is aligned with the laser. Succeeding end plugs are similarly welded. It will be appreciated that the spot weld is applied to the end face substantially along the axial center line and does not extend to any great extent radially outwardly of the center line. If larger welds are desired, multiple weld pulses can be provided while circularly rotating the X-Y slide. That is, the X and Y slides can be stepped to achieve a substantial circular pattern of welds, while a single end plug underlies the laser. Using laser welds results in no discernible distortions of the end plugs and no corrosion or defects appear over the spot weld region. It will also be appreciated that variations in the size of the laser can produce variations in the diameter of the spot weld, as well as the depth of the weld. For example, the following table provides data on power rating versus size of the spot weld.

| LASER SIZE | SPOT WELD DIAMETER | SPOT WELD DEPTH |
| --- | --- | --- |
| 50 W | 0.060" | 0.171" |
| 150 W | 0.080" | 0.0183" |
| 350 W | 0.100" | 0.022" |

Based on the foregoing table, the preferred embodiment of the present invention employs a 350 watt laser to form a 1/10-inch spot weld to a depth of 0.022 inches sufficient to seal and maintain sealed any streamer openings or passages formed generally along the axis of the end plugs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of sealing a solid three-dimensional end plug for a nuclear fuel rod wherein the end plug has an exterior end face and an interior end face on an opposite end of said end plug from said exterior face for registration with nuclear fuel within the fuel rod, comprising the step of, prior to securing the end plug to said nuclear fuel rod, forming a spot weld on said interior end face at a location substantially coincident with a long axis of said end plug passing through said interior and exterior end faces to seal said interior end face and prevent passage of fluid through any streamer passages in the end plug when secured to said nuclear fuel rod, the step of forming the spot weld being performed without the spot weld penetrating through the end plug from said interior face to said exterior end face.

2. A method according to claim 1 wherein the step of forming a spot weld on said interior end face is performed without application of weld material to the end plug.

3. A method according to claim 1 wherein the step of forming a spot weld on said interior end face is performed by melting and solidifying only material forming part of said end plug.

4. A method according to claim 1 wherein the step of forming a spot weld on said interior end face is performed without joining any material with the end plug.

5. A method according to claim 1 wherein the step of forming a spot weld on said interior end face is performed solely by melting material of the end plug along said interior end face thereof and solidifying said melted material along said interior end face.

6. A method according to claim 1 including employing a laser to form the spot weld.

7. A method according to claim 6 including arranging a plurality of cylindrical end plugs on a support, disposing a laser in opposition to interior end faces of said end plugs, applying laser light to each of the interior end faces of said end plugs to form spot welds thereon coincident with long axes of said end plugs, and limiting the spot welds on each interior end face of said end plugs to an area smaller than the diameter of the end face of the end plugs.

8. A method according to claim 1 including, subsequent to forming the spot weld on the end plug, securing said end plug to the nuclear fuel rod with said interior face of said end plug facing the nuclear fuel within the rod.

9. A method of sealing a solid three-dimensional end plug for a nuclear fuel rod wherein the end plug has an exterior end face and an interior end face on an opposite end of said end plug from said interior face for registration with nuclear fuel within the fuel rod, comprising the step of preventing passage of fluid through any streamer passages extending generally axially through the end plug when secured to the nuclear fuel rod by forming a spot weld on said interior end face at a location substantially coincident with a long axis of the end plug passing through the interior and exterior end faces, the step of forming the spot weld being performed without the spot weld penetrating through the end plug from said interior face to said exterior end face and without application of weld material to the end plug.

10. A method according to claim 1 including using a laser to form the weld.

11. A method according to claim 1 wherein the end plug is cylindrical and including limiting the spot weld to an area smaller than the diameter of the end face of the end plug.

12. A method according to claim 1 including arranging a plurality of end plugs on a support, disposing a laser in opposition to interior end faces of said end plugs and applying laser light to each of the end faces of said end plugs to form spot welds thereon.

13. A method according to claim 12 including forming spot welds on said interior end faces coincident with the long axes of said end plugs.

14. A method according to claim 13 wherein the end plug is cylindrical and including limiting the spot weld to an area smaller than the diameter of the end face of the end plug.

15. A method according to claim 12 including relatively displacing said support and said laser such that the laser light is applied in succession to the interior end faces of the plugs.

16. A method according to claim 15 including displacing the laser in a Z direction toward and away from the end faces of the end plugs and moving said support in X and Y directions relative to said laser.

17. A method according to claim 15 including applying said laser light to said end faces in an atmosphere of inert gas.

* * * * *